Feb. 7, 1967 L. SCOTT 3,302,245
APPARATUS FOR FORMING PLASTIC ARTICLES
Filed July 22, 1963 6 Sheets-Sheet 1

INVENTOR.
LESTER SCOTT
BY Arthur L. Urban
ATTORNEY.

Feb. 7, 1967  L. SCOTT  3,302,245
APPARATUS FOR FORMING PLASTIC ARTICLES
Filed July 22, 1963  6 Sheets-Sheet 2

INVENTOR.
LESTER SCOTT
BY Arthur L. Urban
ATTORNEY

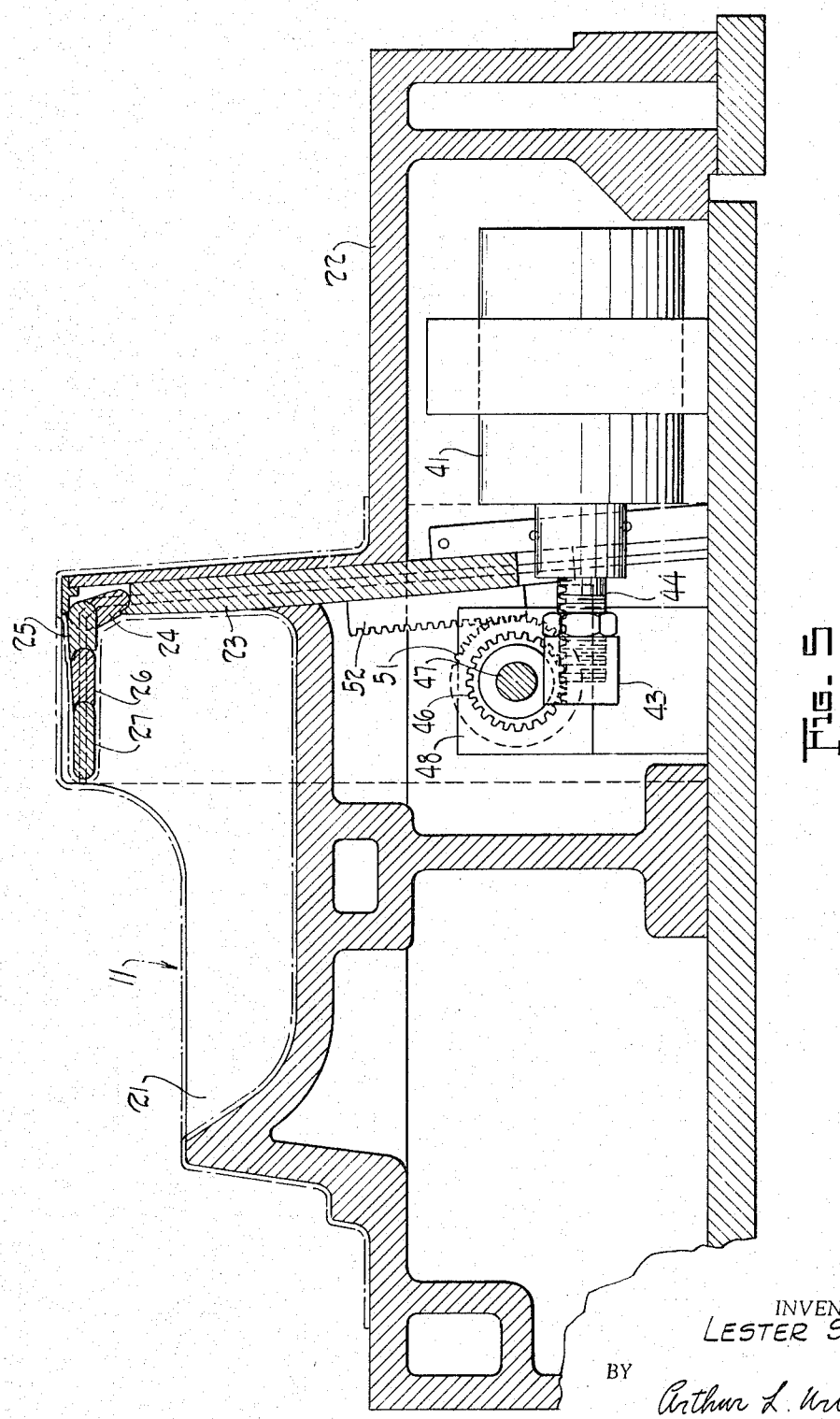

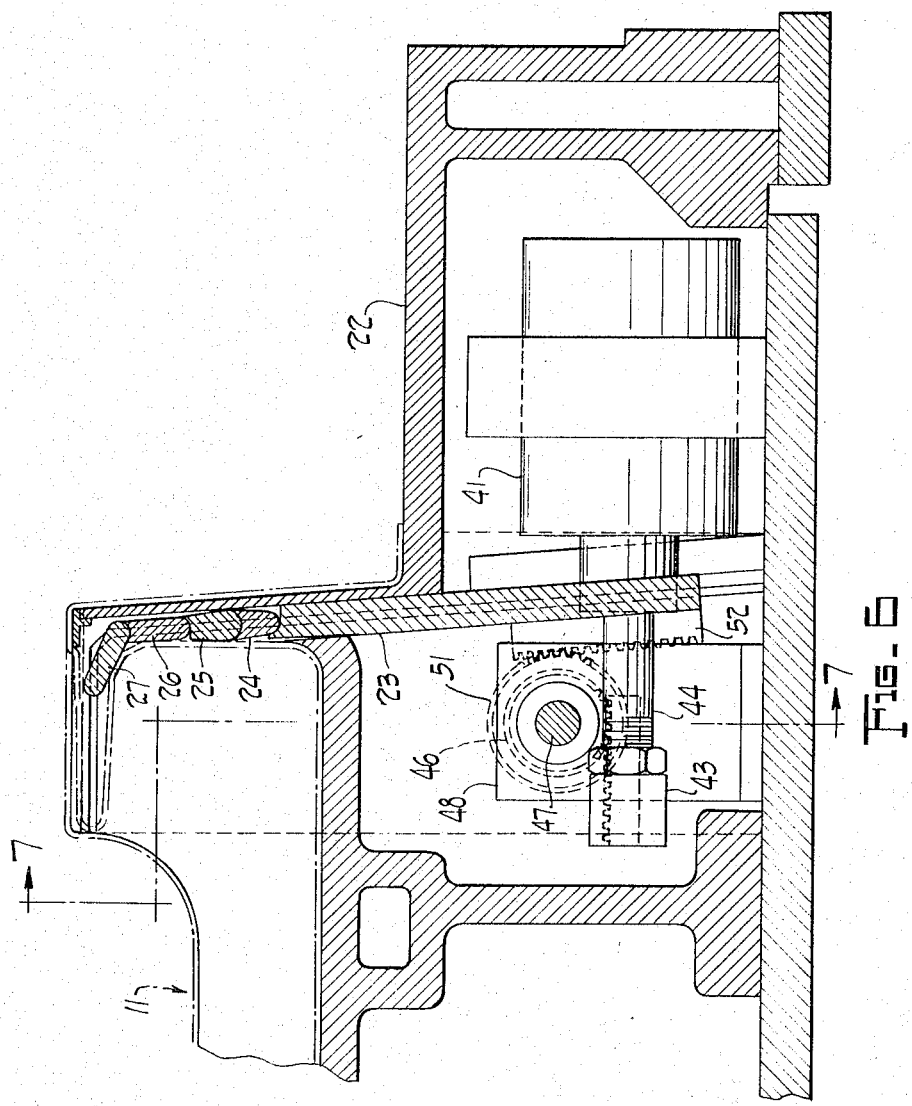

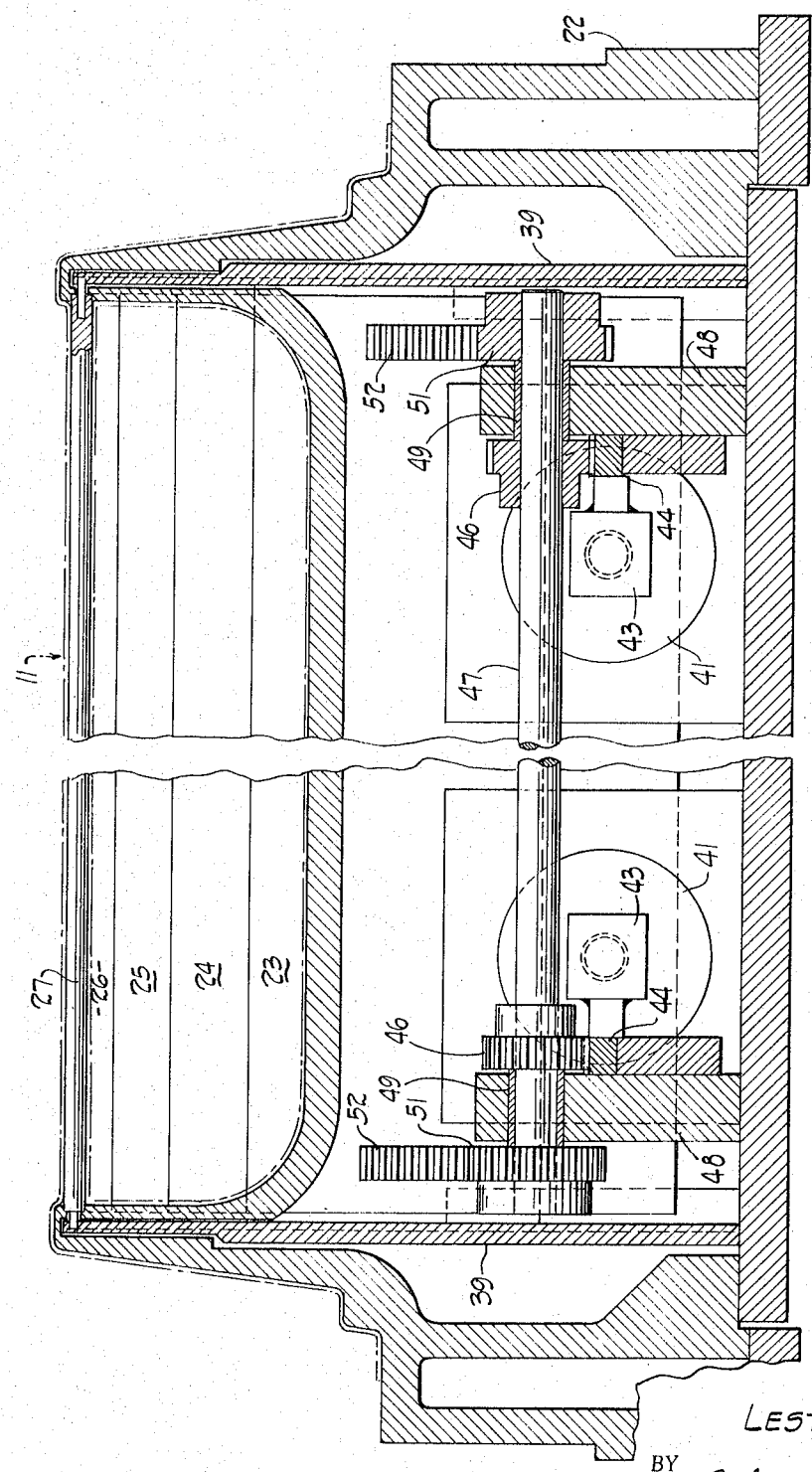

Feb. 7, 1967 L. SCOTT 3,302,245
APPARATUS FOR FORMING PLASTIC ARTICLES
Filed July 22, 1963 6 Sheets-Sheet 6

INVENTOR.
LESTER SCOTT
BY Arthur L. Urban
ATTORNEY.

United States Patent Office 3,302,245
Patented Feb. 7, 1967

3,302,245
APPARATUS FOR FORMING PLASTIC ARTICLES
Lester Scott, Newburgh, Ind., assignor to Kent Plastics Corporation, Evansville Ind., a corporation of Indiana
Filed July 22, 1963, Ser. No. 296,568
7 Claims. (Cl. 18—35)

This invention relates to a novel apparatus for forming plastic articles and more particularly relates to a new and improved apparatus for thermoforming plastic articles.

The design of molds for the formation of plastic articles requires that the core portions of the molds be shaped so that removal of the articles after forming is not hindered or prevented. This design limitation heretofore has seriously restricted the shapes which can be thermoformed. Attempts have been made to provide one or more movable mold cores so that the position of the cores can be shifted after the forming operation to facilitate removal of parts. However, the designs proposed have not provided the high degree of flexibility desired in part and mold design nor in the forming operations.

In view of the above and other shortcomings of plastic forming apparatus employed heretofore, it was completely unexpected and surprising to discover a novel apparatus for forming plastic articles which provide a high degree of flexibilty both in mold and part design and in the forming operations, which flexibility previously was not attainable. The forming apparatus of the invention provides one or more movable mold cores which are relatively simple in design and troublefree in operation over long periods of time even at high speeds. Further, the apparatus of the invention is simple and convenient permitting high production rates.

Other benefits and advantages of the apparatus of the present invention will be apparent from the following description and drawings in which:

FIGURE 5 is an enlarged sectional view taken along line 5—5 of FIGURE 4;

FIGURE 6 is a partial sectional view showing the apparatus of FIGURE 5 in another position;

FIGURE 7 is a sectional view taken along line 7—7 of FIGURE 6;

Figure 1:
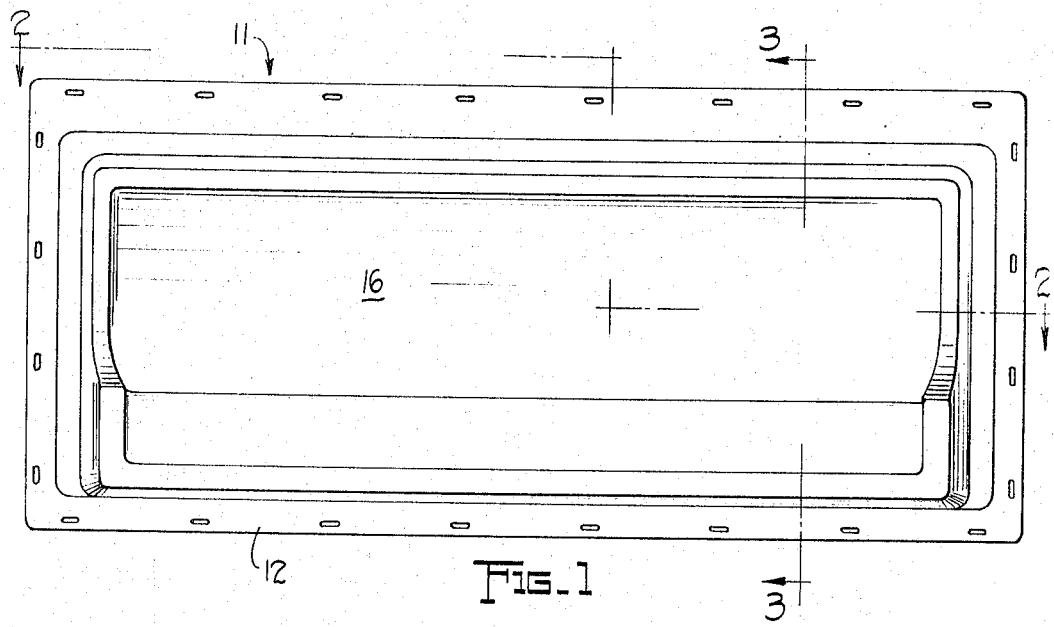
FIGURE 1 is a side elevation of an article formed with the apparatus of the invention.
Figure 2:
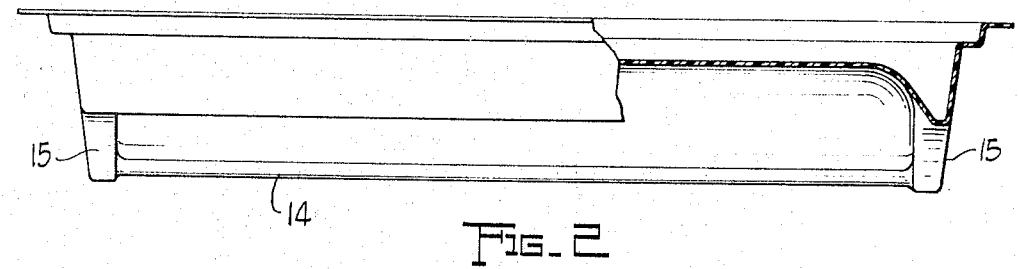
FIGURE 2 is a view partially in section taken along line 2—2 of FIGURE 1.
Figure 3:
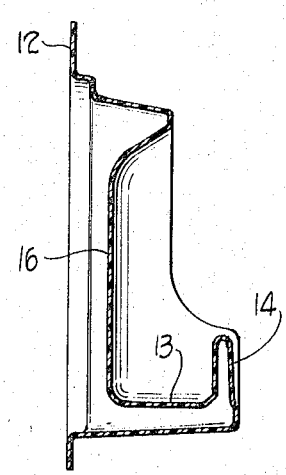
FIGURE 3 is a sectional view taken along line 3—3 of FIGURE 1.
Figure 4:
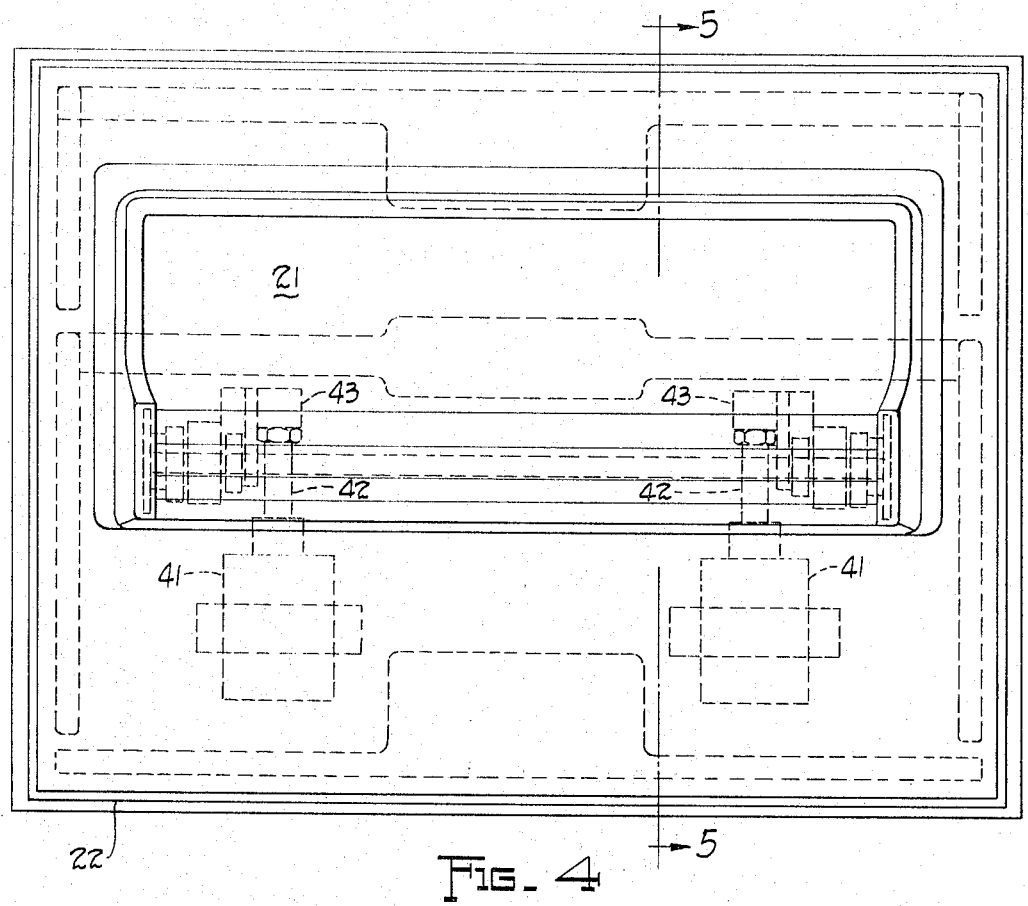
FIGURE 4 is a plan view of one form of apparatus of the invention.
Figure 8:
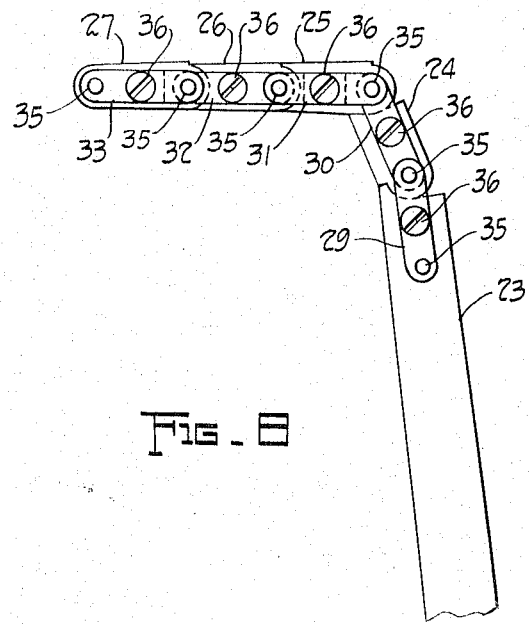
FIGURE 8 is an enlarged view of a portion of the apparatus of the invention.
Figure 9:
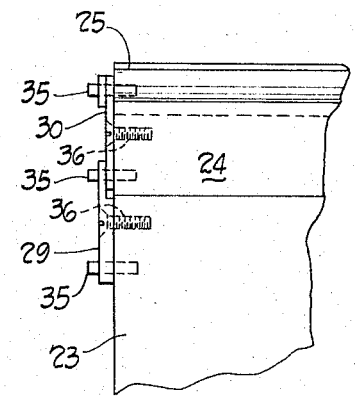
FIGURE 9 is a partial right end view of the apparatus shown in FIGURE 8.
Figure 10:
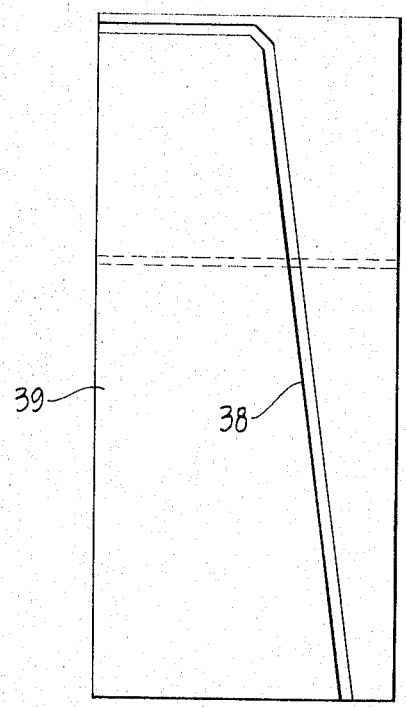
FIGURE 10 is a side elevation of another portion of the apparatus of the inveniton.
Figure 11:
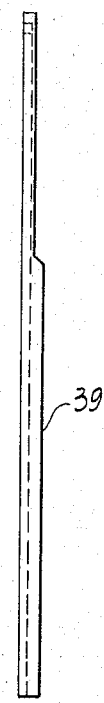
FIGURE 11 is a right end view of the portion shown in FIGURE 10.
Figures 12, 13:
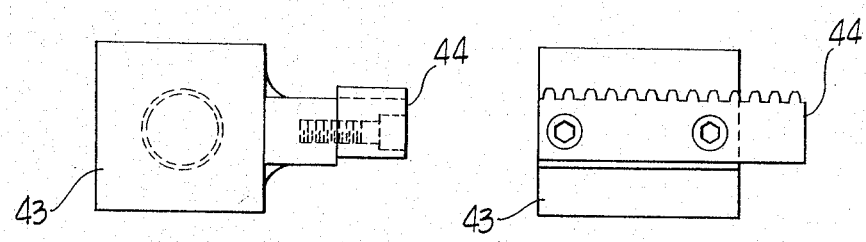
FIGURE 12 is an enlarged view of another portion of the apparatus of the invention.
FIGURE 13 is a right end view of the portion shown in FIGURE 12.

In FIGURES 1–3 of the drawings, a plastic article is shown which may be made with the apparatus of the invention. The article 11 has a peripheral flange 12 and a shelf portion 13 with an upwardly extending face portion 14. At each end of shelf portion 13 and face portion 14 are disposed end portions 15 which are integrally molded therewith. The article 11 also has a rear portion 16 which extends upwardly from the shelf portion 13 and terminates in flange 12.

Apparatus for forming the article described above, as shown in the drawings, comprises a mold having a cavity 21 of a configuration the same as that of article 11 and having a frame 22 extending around the cavity. The cavity 21 includes a movable core portion comprising a plurality of bar members, or segments, 23–27, each of which is pivotally connected to adjacent bars through a series of links 29–33 so that the core portion is thus made flexible. Each link is connected to its corresponding bar by a suitable fastener 36. Pins 35 extend from the ends of each bar through openings in the respective links and move in slots 38 of guide plates 39 disposed adjacent to the ends of the bars.

The movement of bars 23–27 with respect to the mold frame 22 is effected by a suitable drive arrangement which may include, as shown in the drawings, fluid cylinders 41 and piston rods 42. Piston rods 42 are connected to racks 44 through suitable connectors 43. Racks 44 engage pinions 46 which are secured to a shaft 47. Shaft 47 is mounted in suitable bearings 49 between supports 48. Gears 11 also are disposed on shaft 47 and engage racks 52 secured to the lower portion of bar 23.

In the operation of the apparatus of the present invention, fluid is introduced into cylinders 41 advancing the piston rods 42 thereof to extended positions which causes the racks 44 secured thereto by connectors 43 to move away from the cylinders. The movement of racks 44 causes pinions 46 engaged therewith to rotate shaft 47 which produces a rotation of gears 51. The rotation of gears 51 advances racks 52 in engagement therewith upwardly and raises bar 23 to which racks 52 are secured. The upward movement of bar 23 moves bars 24–27 pivotally connected to bar 23 outwardly into their extended position. Since the pins 35 of bars 23–27 are in sliding engagement with guide slots 38 of plates 39, the upward movement of the bars will follow a path set by the guide slots 38.

A heated sheet of the plastic material is positioned adjacent to the mold cavity 21, and the sheet is moved against the mold cavity 21 by withdrawing air from the space between the sheet and the cavity. After the forming is completed, fluid is withdrawn from cylinders 41 causing piston rods 42 to retract so that racks 44 attached thereto produce a reverse rotation of pinions 46 and shaft 47 and thereby also rotate gears 51 in a reverse direction. The reversal of gears 51 moves racks 52 in engagement therewith downward causing the bars 23–27 to retract from the formed article. The retraction of the bars 23–27 frees the article so that it may be easily separated from the mold cavity.

The number, size and shape of the bars comprising the movable core will depend primarily up on the configuration of the molded article which the movable core is to reproduce. The size of the passage through which the core retracts, particularly where the contour of the article undergoes marked change, is important in determining the number of bars to be employed in the movable core.

The above description and drawings show that the present invention provides a novel apparatus for forming plastic articles, which apparatus has a high degree of flexibility both in mold and part design and in the forming operations. In addition, the apparatus of the invention is simple and convenient and permits high production rates, and the apparatus is trouble free in high speed operation. Thus, the novel apparatus of the invention provide benefits and advantages which heretofore were unattainable.

It will be apparent from the above description and drawings that various modifications in the particular apparatus described in detail herein may be made within the scope of the invention. For example, the movable core may be actuated by other drive arrangements such as a rotatable cam, etc. Also, a plurality of movable cores may be employed in the formation of a single article instead of a single movable core. Therefore, the invention is not intended to be limited to the particular apparatus described in detail except as may be required by the following claims.

What is claimed is:

1. Apparatus for thermoforming plastic articles including a mold having a core portion movable between an extended position whereat said core portion extends inwardly into the mold cavity so as to produce an overhang for shaping articles and a retracted position whereat said core portion is withdrawn to facilitate removal of shaped articles, said core portion comprising a plurality of cooperable segments pivoted to one another, guide means for causing said segments to be pivoted to change the direction of said core portion during movement of said core portion from one position to the other, and actuating means for causing movement of said core portion between said extended and retracted positions.

2. The apparatus of claim 1 wherein each said segment has stop means cooperable with an adjacent segment to position and limit pivoting of each said segments in the extended position of said core portion.

3. The apparatus of claim 1 wherein the mold is a vacuum type mold.

4. The apparatus of claim 1 wherein said actuating means includes a rack and pinion to effect movement of said core portion between said extended and retracted positions.

5. The apparatus of claim 1 wherein said segments are pivoted to one another substantially edge to edge.

6. The apparatus of claim 5 wherein each said segment is a bar pivotally connected at its edge to an adjacent bar to form a flexible core portion.

7. Apparatus for thermoforming plastic articles including a mold having a core portion movable between an extended position whereat the core portion extends inwardly into the mold cavity so as to produce an overhang for shaping articles and a retracted position for facilitating removal of shaped articles, said positions of said core portion being substantially normal to one another, and said core portion comprising a plurality of cooperable segments edgewise pivoted to one another whereby said core portion is flexible, actuating means for causing movement of said core portion between said extended and retracted positions, and guide means for causing said segments to pivot as said core portion is moved from one position to the other to achieve said directional change between said positions of said core portion.

References Cited by the Examiner

UNITED STATES PATENTS

| | | | |
|---|---|---|---|
| 765,349 | 7/1904 | Wilson | 249—178 |
| 900,276 | 10/1908 | Geffers | 18—19 |
| 1,795,021 | 3/1931 | Goin | 249—181 |
| 2,138,693 | 11/1938 | Corwin | 249—181 |
| 2,288,991 | 7/1942 | Burman | 249—185 |
| 2,784,455 | 3/1957 | Pulaski. | |
| 3,058,153 | 10/1962 | Busch | 18—19 |
| 3,077,646 | 2/1963 | Tigerschiold | 249—180 |
| 3,100,919 | 8/1963 | Vayda | 249—181 |
| 3,126,582 | 3/1964 | Scott. | |
| 3,143,306 | 8/1964 | Dijkmans et al. | 249—181 |
| 3,152,365 | 10/1964 | Fisher. | |
| 3,165,787 | 1/1965 | Carmack | 18—42 |
| 3,225,395 | 12/1965 | Karmerze et al. | 249—180 |

FOREIGN PATENTS

| | | |
|---|---|---|
| 68,736 | 1/1958 | France. |
| 1,237,243 | 6/1960 | France. |

J. SPENCER OVERHOLSER, *Primary Examiner.*

J. HOWARD FLINT, JR., *Examiner.*